(12) United States Patent
Benning et al.

(10) Patent No.: US 6,980,778 B2
(45) Date of Patent: Dec. 27, 2005

(54) SPLIT SHIFT PHASE SWEEP TRANSMIT DIVERSITY

(75) Inventors: Roger David Benning, Long Valley, NJ (US); R. Michael Buehrer, Morristown, NJ (US); Paul Anthony Polakos, Marlboro, NJ (US); Robert Atmaram Soni, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 861 days.

(21) Appl. No.: 09/918,086

(22) Filed: Jul. 30, 2001

(65) Prior Publication Data

US 2003/0022634 A1 Jan. 30, 2003

(51) Int. Cl.$^7$ ................................. H04B 7/02
(52) U.S. Cl. ................. 455/101; 455/103; 375/267
(58) Field of Search .................. 455/42, 118, 101, 455/127.1, 127.5, 15, 23, 103, 108, 303; 375/260, 267

(56) References Cited

U.S. PATENT DOCUMENTS

| | | | | |
|---|---|---|---|---|
| 5,584,057 | A | * 12/1996 | Dent ........................... | 455/101 |
| 6,085,074 | A | * 7/2000 | Cygan ..................... | 455/241.1 |
| 6,308,052 | B1 | * 10/2001 | Jamali et al. .................. | 455/78 |
| 6,594,473 | B1 | * 7/2003 | Dabak et al. ................ | 455/101 |
| 6,621,876 | B2 | * 9/2003 | Camp et al. ................. | 375/296 |
| 6,704,370 | B1 | * 3/2004 | Chheda et al. .............. | 375/299 |
| 6,788,661 | B1 | * 9/2004 | Ylitalo et al. ................ | 370/334 |

OTHER PUBLICATIONS

Gutierrez, A. et al.: "An Introduction to PSTD for IS-95 and CDMA2000", Wireless Communications and Networking Conference, 1999, WCNC, 1999, Sep. 21, 1999, pp. 1358-1362, XP001084288, the whole document.

Su B D et al: "Phase Sweeping Transmitter diversity in mobile communications", Vehicular Technology Conference, 1996, Mobile Technology for the Human Race, IEEE 46$^{th}$ Atlanta, GA, USA Apr. 28-May 1, 1996, New York, NY, USA, IEEE, US, Apr. 28, 1996, pp. 131-135, XP010162362, ISBN: 0-7803-3157-5, pp. 131-135, XP010162362, ISBN: 0-7803-3157-5, p. 131, left-hand column, line 1-p. 132, left-hand colum, last line; figure 1.

Chheda A: "On the Forward Link Capacity of a CDMA2000-1X System With Transmit Diversity" VTC 2000-Fall. IEEE VTS 52$^{nd}$, Vehicular Technology Conference. Boston, MA, Sep. 24-28, 2000, IEEE Vehicular Technology Conference, New York, NY: IEEE, US, vol. 2 of 6. Conf. 52, Sep. 24, 2000, pp. 618-623, XP001017320, ISBN: 0-7803-6508-9, p. 618, left-hand column, line 1- p. 619, left-hand column, line 32.

Hiroike A et al: "Combined Effects of Phase Sweeping Transmitter Diversity and Channel Coding", IEEE Transactions on Vehicular Technology, vol. 41, No. 2, May 1992, pp. 170-176, XP000108448, the whole document.

European Search Report dated Aug. 2, 2002.

* cited by examiner

*Primary Examiner*—Bing Q. Bui
(74) *Attorney, Agent, or Firm*—Jimmy Goo

(57) ABSTRACT

Disclosed is a method and apparatus of transmit diversity that is backward compatible and does not degrade performance using a transmission architecture that incorporates a form of phase sweep transmit diversity (PSTD) referred to herein as split shift PSTD. Split shift PSTD involves transmitting at least two phase swept versions of a signal over diversity antennas, wherein the two phase swept versions of the signal have a different phase. The phase sweep frequency signals may have a fixed or varying phase shifting rate, may have an identical or different phase shifting rate, may be offset from each other and/or may be phase shifting in the same or opposite direction.

19 Claims, 2 Drawing Sheets

SPLIT SHIFT PHASE SWEEP TRANSMIT DIVERSITY

RELATED APPLICATION

Related subject matter is disclosed in the following applications filed concurrently and assigned to the same assignee hereof: U.S. patent application Ser. No. 09/918,393 entitled, "Biased Phase Sweep Transmit Diversity," inventors Roger Benning, R. Michael Buehrer and Robert Atmaram Soni; U.S. patent application Ser. No. 09/918,392 entitled, "Symmetric Sweep Phase Sweep Transmit Diversity," inventors Roger Benning, R. Michael Buebrer, Paul A. Polakos and Mark Kraml; and U.S. patent application Ser. No. 09/918, 391 entitled, "Space Time Spreading and Phase Sweep Transmit Diversity," inventors Roger Benning. R. Michael Buehrer, Paul A. Polakos and Robert Atmaram Soni.

BACKGROUND OF THE RELATED ART

Performance of wireless communication systems is directly related to signal strength statistics of received signals. Third generation wireless communication systems utilize transmit diversity techniques for downlink transmissions (i.e., communication link from a base station to a mobile-station) in order to improve received signal strength statistics and, thus, performance. Two such transmit diversity techniques are space time spreading (STS) and phase sweep transmit diversity (PSTD).

FIG. 1 depicts a wireless communication system 10 employing STS. Wireless communication system 10 comprises at least one base station 12 having two antenna elements 14-1 and 14-2, wherein antenna elements 14-1 and 14-2 are spaced far apart for achieving transmit diversity. Base station 12 receives a signal S for transmitting to mobile-station 16. Signal S is alternately divided into signals $s_e$ and $s_o$, wherein signal $s_e$ comprises even data bits and signal $s_o$ comprises odd data bits. Signals $s_e$ and $s_o$ are processed to produce signals $S^{14-1}$ and $S^{14-2}$. Specifically, $s_e$ is multiplied with Walsh code $w_1$ to produce signal $s_e w_1$; a conjugate of signal $s_o$ is multiplied with Walsh code $w_2$ to produce signal $s_o^* w_2$; signal $s_o$ is multiplied with Walsh code $w_1$ to produce $s_o w_1$; and a conjugate of signal $s_e$ is multiplied with Walsh code $w_2$ to produce $s_e^* w_2$. Signal $s_e w_1$ is added to signal $s_o^* w_2$ to produce signal $S^{14-1}$ (i.e., $S^{14-1}=s_e w_1+s_o^* w_2$) and signal $s_e^* w_2$ is subtracted from signal $s_o w_1$ to produce signal $S^{14-2}$ (i.e., $S^{14-2}=s_o w_1-s_e^* w_2$). Signals $S^{14-1}$ and $S^{14-2}$ are transmitted at substantially equal or identical power levels over antenna elements 14-1 and 14-2, respectively. For purposes of this application, power levels are "substantially equal" or "identical" when the power levels are within 1% of each other.

Mobile-station 16 receives signal R comprising $\gamma_1(S^{14-2})+\gamma_2(S^{14-2})$, wherein $\gamma_1$ and $\gamma_2$ are distortion factor coefficients associated with the transmission of signals $S^{14-1}$ and $S^{14-2}$ from antenna elements 14-1 and 14-2 to mobile-station 16, respectively. Distortion factor coefficients $\gamma_1$ and $\gamma_2$ can be estimated using pilot signals, as is well-known in the art. Mobile-station 16 decodes signal R with Walsh codes $w_1$ and $w_2$ to respectively produce outputs:

$$W_1=\gamma_1 s_e+\gamma_2 s_o \qquad \text{equation 1}$$

$$W_2=\gamma_1 s_o^*-\gamma_2 s_e^* \qquad \text{equation 1a}$$

Using the following equations, estimates of signals $s_e$ and $s_o$, i.e., $\hat{s}_e$ and $\hat{s}_o$, may be obtained:

$$\hat{s}_e=\gamma_1^* W_1-\gamma_2 W_2^*=s_e(|\gamma_1|^2+|\gamma_2|^2)+\text{noise} \qquad \text{equation 2}$$

$$\hat{s}_o=\gamma_2^* W_1+\gamma_1 W_2^*=s_o(|\gamma_1|^2+|\gamma_2|^2)+\text{noise'} \qquad \text{equation 2a}$$

However, STS is a transmit diversity technique that is not backward compatible from the perspective of the mobile-station. That is, mobile-station 16 is required to have the necessary hardware and/or software to decode signal R. Mobile-stations without such hardware and/or software, such as pre-third generation mobile-stations, would be incapable of decoding signal R.

By contrast, phase sweep transmit diversity (PSTD) is backward compatible from the perspective of the mobile-station. FIG. 2 depicts a wireless communication system 20 employing PSTD. Wireless communication system 20 comprises at least one base station 22 having two antenna elements 24-1 and 24-2, wherein antenna elements 24-1 and 24-2 are spaced far apart for achieving transmit diversity. Base station 22 receives a signal S for transmitting to mobile-station 26. Signal S is evenly power split into signals $s_1$ and $s_2$ and processed to produce signals $S^{24-1}$ and $S^{24-2}$, where $s_1=s_2$. Specifically, signal $s_1$ is multiplied by Walsh code $w_k$ to produce $S^{24-1}=s_1 w_k$, where k represents a particular user or mobile-station. Signal $s_2$ is multiplied by Walsh code $w_k$ and a phase sweep frequency signal $e^{j2\pi f_s t}$ to produce $S^{24-2}$, i.e., $S^{24-2}=s_2 w_k e^{j2\pi f_s t}=s_1 w_k e^{j2\pi f_s t}=S^{24-1} e^{j2\pi f_s t}$, where $f_s$ is a phase sweep frequency and t is time. Signals $S^{24-1}$ and $S^{24-2}$ are transmitted at substantially equal power levels over antenna elements 24-1 and 24-2, respectively. Note that the phase sweep signal $e^{j2\pi f_s t}$ is being represented in complex baseband notation, i.e., $e^{j2\pi f_s t}=\cos(2\pi f_s t)+j\sin(2\pi f_s t)$. It should be understood that the phase sweep signal may also be applied at an intermediate frequency or a radio frequency.

Mobile-station 26 receives signal R comprising $\gamma_1 S^{24-1}+\gamma_2 S^{24-2}$. Simplifying the equation for R results in $$R=\gamma_1 S^{24-1}+\gamma_2 S^{24-1} e^{j2\pi f_s t} \qquad \text{equation 3}$$

$$R=S^{24-1}\{\gamma_1+\gamma_2 e^{j2\pi f_s t}\} \qquad \text{equation 3a}$$

$$R=S^{24-1}\gamma_{eq} \qquad \text{equation 3b}$$

where $\gamma_{eq}$ is an equivalent channel seen by mobile-station 26. Distortion factor coefficient $\gamma_{eq}$ can be estimated using pilot signals and used, along with equation 3b, to obtain estimates of signal $s_1$ and/or $s_2$.

In slow fading channel conditions, PSTD improves performance (relative to when no transmit diversity technique is used) by making the received signal strength statistics associated with a slow fading channel at the receiver look like those associated with a fast fading channel. However, PSTD causes the energy of the transmitted signals to be concentrated at some frequency between the carrier frequency and the phase sweep frequency. If the frequency at which the transmitted signals are concentrated is not within some frequency tolerance of a mobile-station or receiver to which the signals are intended, the mobile-station or receiver may not be able to or may have difficulty receiving or processing the signals which, in turn, may degrade performance. Accordingly, there exists a need for a transmit diversity technique that is backward compatible without degrading performance.

SUMMARY OF THE INVENTION

The present invention is a method and apparatus of transmit diversity that is backward compatible and does not degrade performance using a transmission architecture that incorporates a form of phase sweep transmit diversity (PSTD) referred to herein as split shift PSTD. Split shift PSTD involves transmitting at least two phase swept versions of a signal over diversity antennas, wherein the two phase swept versions of the signal have a different frequency or phase sweep rate. In one embodiment, a signal is split into a first and a second signal. The first and second signal are phase swept in equal and opposite directions using different phase sweep frequency signals, which would allow energies associated with the transmitted signals to be concentrated near a carrier frequency. In other embodiments, the phase sweep frequency signals may have a fixed or varying phase shifting rate, may have an identical or different phase shifting rate, may be offset from each other and/or may be phase shifting in the same or opposite direction.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
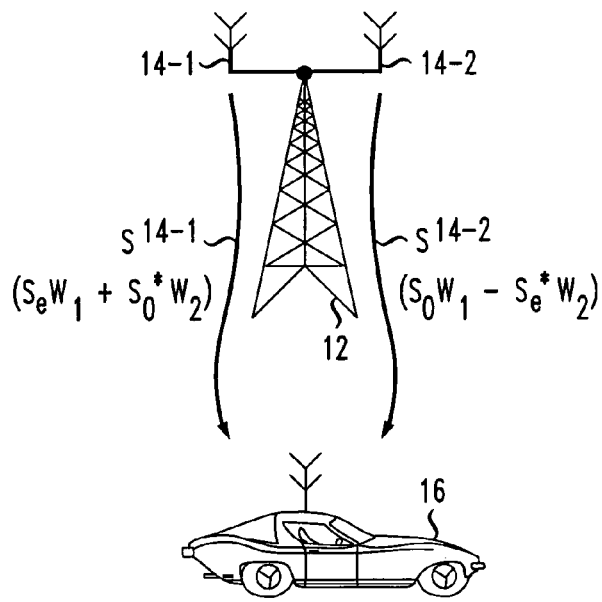
FIG. 1 depicts a wireless communication system employing space time spreading techniques in accordance with the prior art.
Figure 2:
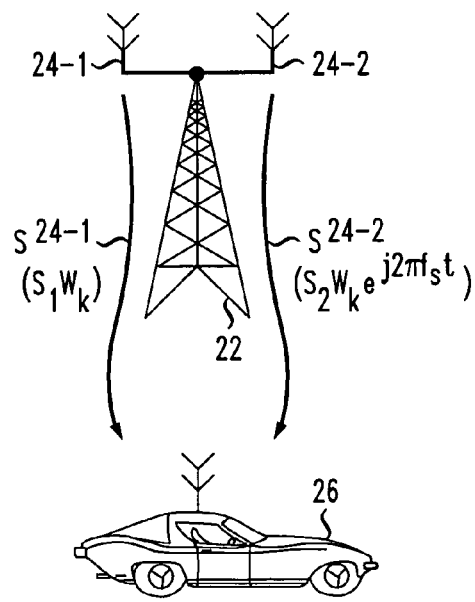
FIG. 2 depicts a wireless communication system employing phase sweep transmit diversity in accordance with the prior art.
Figure 3:
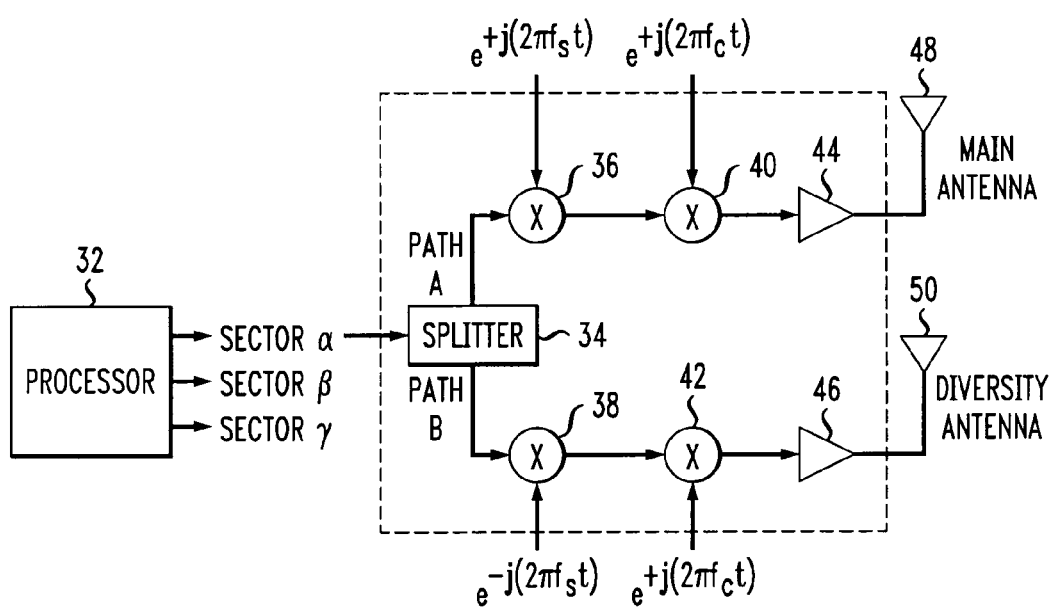
FIG. 3 depicts a base station employing split shift phase sweep transmit diversity (PSTD) and code division multiple access (CDMA) in accordance with the present invention.

FIG. 3 depicts a base station 30 employing split shift phase sweep transmit diversity (PSTD) and code division multiple access (CDMA) in accordance with the present invention. Split shift PSTD involves transmitting at least two phase swept versions of a signal over diversity antennas, wherein the two phase swept versions of the signal have a different phase. In one embodiment, a signal is split into a first and a second signal. The first and second signal are phase swept in equal and opposite directions using different phase sweep frequency signals, which would allow energies associated with the transmitted signals to be concentrated near a carrier frequency. In other embodiments, the phase sweep frequency signals may have a fixed or varying phase shifting rate, may have an identical or different phase shifting rate, and/or may be phase shifting in the same or opposite direction. Advantageously, split shift PSTD is backwards compatible from the perspective of mobile-stations. CDMA is well-known in the art.

Base station 30 provides wireless communication services to mobile-stations, not shown, in its associated geographical coverage area or cell, wherein the cell is divided into three sectors $\alpha$, $\beta$, $\gamma$. Base station 30 includes a transmission architecture that split shift PSTD, as will be described herein.

Base station 30 comprises a processor 32, a splitter 34, multipliers 36, 38, 40, 42, amplifiers 44, 46, and a pair of diversity antennas 48, 50. Note that base station 30 also includes configurations of splitters, multipliers, amplifiers and antennas for sectors $\beta$, $\gamma$ that are identical to those for sector $\alpha$. For simplicity sake, the configurations for sectors $\beta$, $\gamma$ are not shown. Additionally, for discussion purposes, it is assumed that signals $S_k$ are intended for mobile-stations k located in sector $\alpha$ and, thus, the present invention will be described with reference to signals $S_k$ being processed for transmission over sector $\alpha$.

Processor 32 includes software for processing signals $S_k$ in accordance with well-known CDMA techniques to produce an output signal $S_{k-1}$. Note that, in another embodiment, processor 32 is operable to process signals $S_k$ in accordance with a multiple access technique other than CDMA, such as time or frequency division multiple access.

Signal $S_{k-1}$ is split by splitter 34 into signals $S_{k-1}(a)$, $S_{k-1}(b)$ and processed along paths A and B, respectively, by multipliers 36, 38, 40, 42, and amplifiers 44, 46 in accordance with split shift PSTD techniques, wherein signal $S_{k-1}(a)$ is identical to signal $S_{k-1}(b)$ in terms of data. In one embodiment, signal $S_{k-1}$ is unevenly power split by splitter 34 such that the power level of signal $S_{k-1}(a)$ is higher than the power level of signal $S_{k-1}(b)$. For example, signal $S_{k-1}$ is power split such that signal $S_{k-1}(a)$ gets 5/8 of signal $S_{k-1}$'s power and signal $S_{k-1}(b)$ gets 3/8 of signal $S_{k-1}$'s power, i.e., $S_{k-1}(a)=\sqrt{mt;epmrl;}\sqrt{5/8}rlxmx(S_{k-1})$ and $S_{k-1}(b)= mt;epmrl;\sqrt{3/8}rlxmx(S_{k-1})$. In another example, signal $S_{k-1}$ is power split such that signal $S_{k-1}(a)$ gets 2/3 of signal $S_{k-1}$'s power and signal $S_{k-1}(b)$ gets 1/3 of signal $S_{k-1}$'s power. In one embodiment, signal $S_{k-1}$ is unevenly power split by splitter 34 such that the power level of signal $S_{k-1}(b)$ is higher than the power level of signal $S_{k-1}(a)$, or signal $S_{k-1}$ is evenly power split into signals $S_{k-1}(a)$, $S_{k-1}(b)$.

Signal $S_{k-1}(a)$ and phase sweep frequency signal $e^{j\Theta_s(t)}$ are provided as inputs into multiplier 36 where signal $S_{k-1}(a)$ is phase swept with phase sweep frequency signal $e^{j\Theta_s(t)}$ to produce signal $S_{36}=S_{k-1}(a)e^{j\Theta_s(t)}$, wherein $\Theta_s=2\pi f_s t$, $e^{j\Theta_s(t)}=\cos(2\pi f_s t)+j\sin(2\pi f_s t)$, $f_s$ represents a phase sweep frequency and t represents time. Signal $S_{k-1}(b)$ and phase sweep frequency signal $e^{-j\Theta_s(t)}$ are provided as inputs into multiplier 38 where signal $S_{k-1}(b)$ is frequency phase swept with signal $e^{-j\Theta_s(t)}$ to produce signal $S_{38}=S_{k-1}(b)e^{-j\Theta_s(t)}$. In another embodiment, phase sweep frequency signal $e^{-j\Theta_s(t)}$ is used to phase sweep signal $S_{k-1}(a)$, and phase sweep frequency signal $e^{j\Theta_s(t)}$ is used to phase sweep signal $S_{k-1}(b)$.

Note that phase sweep frequency signals $e^{j\Theta_s(t)}$, $e^{-j\Theta_s(t)}$ phase sweeps signals $S_{k-1}(a)$, $S_{k-1}(b)$ an equal amount but in opposite directions. Advantageously, this choice of phase sweep frequency signals $e^{j\Theta_s(t)}$, $e^{-j\Theta_s(t)}$ results in the energy of the transmitted signals at mobile-stations to be concentrated at or near a carrier frequency $f_c$. In other embodiments, the phase sweep frequency signals used to phase sweep $S_{k-1}(a)$, $S_{k-1}(b)$ may have a fixed or varying phase shifting rate, may have an identical or different phase shifting rate, may be offset from each other and/or may be phase shifting in the same or opposite direction.

Signal $S_{36}$ and carrier signal $e^{j2\pi f_c t}$ are provided as inputs into multiplier 40 to produce signal $S_{40}$, where $S^{40}=S_{k-1}(a)e^{j\Theta_s(t)}e^{j2\pi f_c t}$, $e^{j2\pi f_c t}=\cos(2\pi f_c t)+j\sin(2\pi f_c t)$. Similarly, signal $S_{38}$ and carrier signal $e^{j2\pi f_c t}$ are provided as inputs into multiplier 42 to produce signal $S_{42}$, where $S^{42}=S_{k-1}(b)e^{-j\Theta_s(t)}e^{j2\pi f_c t}$.

Signals $S_{40}$, $S_{42}$ are amplified by amplifiers 44, 46 to produce signals $S_{44}$ and $S_{46}$ for transmission over antennas 48, 50, respectively, where signal $S_{44}=A_{44}S_{k-1}(a)e^{j\Theta_s(t)}e^{j2\pi f_c t}$, $S_{46}=A_{46}S_{k-1}(b)e^{-j\Theta_s(t)}e^{j2\pi f_c t}$, $A_{44}$ represents the amount of gain associated with amplifier 44 and $A_{46}$ represents the amount of gain associated with amplifier 46.

In one embodiment, the amounts of gain $A_{44}$, $A_{46}$ are equal. In this embodiment, signal $S_{k-1}$ may be split by splitter 34 such that the power level of signal $S_{k-1}(a)$ is higher than the power level of signal $S_{k-1}(b)$, or vice-versa, so that differences in power level between signals $S_{44}$ and $S_{46}$ are not as large compared to an even power split of signal $S_{k-1}$. Alternately, signal $S_{k-1}$ may be equally split by splitter 34.

In another embodiment, the amounts of gain $A_{44}$, $A_{46}$ are different and related to how splitter 34 power splits signal $S_{k-1}$. For example, the amount of gain $A_{44}$, $A_{46}$ applied to signals $S_{36}$, $S_{38}$ may be an amount that would cause the power levels of signals $S_{44}$ and $S_{46}$ to be approximately equal. For purposes of this application, power levels are "approximately equal" when the power levels are within 10% of each other. In another example, the signal, e.g., $S_{36}$ or $S_{38}$, associated with a greater power level is amplified more than the other signal.

Although the present invention has been described in considerable detail with reference to certain embodiments, other versions are possible. Therefore, the spirit and scope of the present invention should not be limited to the description of the embodiments contained herein.

We claim:

1. A method of signal transmission comprising the steps of:

splitting a signal $s_1$ into signals $s_1(a)$ and $s_1(b)$, wherein the signal $s_1$ is split unevenly such that the signal $s_1(a)$ has an associated power level greater than a power level associated with the signal $s_1(b)$;

phase sweeping the signal $s_1(a)$ using a first phase sweep frequency signal to produce a phase swept signal $s_1(a)$; and phase sweeping the signal $s_1(b)$ using a second phase sweep frequency signal to produce a phase swept signal $s_1(b)$, wherein the phase swept signal $s_1(a)$ has a different phase from the phase swept signal $s_1(b)$.

2. The method of claim 1, wherein the first phase sweep frequency signal phase sweeps the signal $s_1(a)$ in a direction opposite to a direction the second phase sweep frequency signal phase sweeps the signal $s_1(b)$.

3. The method of claim 2, wherein a first phase sweep frequency associated with the first phase sweep frequency signal is identical to a second phase sweep frequency associated with the second phase sweep frequency signal.

4. The method of claim 2, wherein a first phase sweep frequency associated with the first phase sweep frequency signal is not identical to a second phase sweep frequency associated with the second phase sweep frequency signal.

5. The method of claim 2, wherein a first phase sweep frequency associated with the first phase sweep frequency signal is a fixed phase shifting rate.

6. The method of claim 2, wherein a first phase sweep frequency associated with the first phase sweep frequency signal is a variable phase shifting rate.

7. The method of claim 2, wherein a second phase sweep frequency associated with the second phase sweep frequency signal is a fixed phase shifting rate.

8. The method of claim 2, wherein a second phase sweep frequency associated with the second phase sweep frequency signal is a variable phase shifting rate.

9. The method of claim 1, wherein the first and second phase sweep frequency signals phase sweep the signals $s_1(a)$ and $s_1(b)$ in a same direction.

10. The method of claim 9, wherein a first phase sweep frequency associated with the first phase sweep frequency signal is identical to a second phase sweep frequency associated with the second phase sweep frequency signal.

11. The method of claim 9, wherein a first phase sweep frequency associated with the first phase sweep frequency signal is not identical to a second phase sweep frequency associated with the second phase sweep frequency signal.

12. The method of claim 1 comprising the additional step of:

amplifying the phase swept signals $s_1(a)$ and $s_1(b)$.

13. The method of claim 1 comprising the additional step of:

transmitting the phase swept signals $s_1(a)$ and $s_1(b)$ over a pair of diversity antennas.

14. A method of signal transmission comprising the steps of:

splitting a signal $s_1$ into signals $s_1(a)$ and $s_1(b)$, wherein the signal $s_1$ includes a communication signal;

phase sweeping the signal $s_1(a)$ using a first phase sweep frequency signal to produce a phase swept signal $s_1(a)$; and phase sweeping the signal $s_1(b)$ using a second phase sweep frequency signal to produce a phase swept signal $s_1(b)$, wherein the phase swept signal $s_1(a)$ has a different phase from the phase swept signal $s_1(b)$, and the first phase sweep frequency signal phase sweeps the signal $s_1(a)$ in a direction opposite to a direction the second phase sweep frequency signal phase sweeps the signal $s_1(b)$.

15. The method of claim 14, wherein a first phase sweep frequency associated with the first phase sweep frequency signal is identical to a second phase sweep frequency associated with the second phase sweep frequency signal.

16. The method of claim 14, wherein a first phase sweep frequency associated with the first phase sweep frequency signal is not identical to a second phase sweep frequency associated with the second phase sweep frequency signal.

17. The method of claim 14, wherein a first phase sweep frequency associated with the first phase sweep frequency signal is a fixed or a variable phase shifting rate.

18. The method of claim 14, wherein a second phase sweep frequency associated with the second phase sweep frequency signal is a fixed or variable phase shifting rate.

19. The method of claim 14 comprising the additional step of:

amplifying the phase swept signals $s_1(a)$ and $s_1(b)$.

* * * * *